(12) United States Patent
Prost-Fin et al.

(10) Patent No.: US 7,605,694 B2
(45) Date of Patent: Oct. 20, 2009

(54) STEERING WHEEL ASSEMBLY FOR A MOTOR VEHICLE

(75) Inventors: Marc Prost-Fin, Berlin (DE); Frederike Keudel, Berlin (DE); Delf Neumann, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 11/826,834

(22) Filed: Jul. 18, 2007

(65) Prior Publication Data

US 2008/0023254 A1    Jan. 31, 2008

Related U.S. Application Data

(63) Continuation of application No. PCT/DE2006/000095, filed on Jan. 18, 2006.

(60) Provisional application No. 60/644,575, filed on Jan. 19, 2005.

(30) Foreign Application Priority Data

Jan. 19, 2005   (DE)   ................. 10 2005 003 187
Nov. 10, 2005   (DE)   ................. 10 2005 054 640

(51) Int. Cl.
*B60Q 1/00* (2006.01)

(52) U.S. Cl. .................. 340/438; 340/575; 340/576

(58) Field of Classification Search ................. 340/438, 340/575, 576; 180/272, 273; 701/45
See application file for complete search history.

(56) References Cited

U.S. PATENT DOCUMENTS

| 4,722,550 | A | | 2/1988 | Imaoka et al. |
|---|---|---|---|---|
| 5,197,562 | A | | 3/1993 | Kakinami et al. |
| 5,477,457 | A | | 12/1995 | Okada |
| 5,488,353 | A | * | 1/1996 | Kawakami et al. .......... 340/576 |
| 5,585,785 | A | * | 12/1996 | Gwin et al. ................. 340/575 |
| 5,666,102 | A | | 9/1997 | Lahiff |
| 5,689,241 | A | * | 11/1997 | Clarke et al. ................ 340/575 |
| 5,793,292 | A | * | 8/1998 | Ivey, Jr. ..................... 340/576 |
| 5,821,935 | A | | 10/1998 | Hartman et al. |
| 6,125,320 | A | | 9/2000 | Hellmann et al. |

(Continued)

FOREIGN PATENT DOCUMENTS

CN    1424968 A    6/2003

(Continued)

OTHER PUBLICATIONS

Burnett, A Road-Based Evaluation of a Head-Up Display for Presenting Navigation Information, Proceedings of HCI International Conference, Jun. 23-27, 2003, pp. 180-184, vol. 3, Greece.

(Continued)

*Primary Examiner*—John A Tweel, Jr.
(74) *Attorney, Agent, or Firm*—Foley & Lardner LLP

(57) ABSTRACT

A steering wheel assembly for a motor vehicle is provided. The assembly includes a steering wheel, a steering wheel rim of the steering wheel at least partially rotating about a steering axis about which the steering wheel is mounted to be rotatable at an angle to the steering axis, at least one display device, arranged on the steering wheel, for displaying travel-related information of a motor vehicle, and at least one detection device, disposed on the steering wheel, for detecting an attentiveness level of the driver of the motor vehicle. The detection device is adapted to control the display device depending on the detected attentiveness level of the driver. The application is characterized that the at least one display device is mounted on the steering wheel rim.

34 Claims, 9 Drawing Sheets

U.S. PATENT DOCUMENTS

| | | |
|---|---|---|
| 6,253,131 B1 | 6/2001 | Quigley et al. |
| 6,373,472 B1 * | 4/2002 | Palalau et al. ............... 345/173 |
| 6,449,535 B1 | 9/2002 | Obradovich et al. |
| 6,450,573 B1 | 9/2002 | Yamaguchi et al. |
| 6,476,730 B2 | 11/2002 | Kakinami et al. |
| 6,739,620 B2 | 5/2004 | Derrick |
| 6,837,540 B2 | 1/2005 | Yamaguchi et al. |
| 6,860,508 B2 | 3/2005 | Keutz |
| 6,908,149 B1 | 6/2005 | Yamaguchi et al. |
| 6,922,616 B2 | 7/2005 | Obradovich et al. |
| 6,927,694 B1 * | 8/2005 | Smith et al. ................. 340/576 |
| 6,983,170 B2 * | 1/2006 | Stulberger ............... 455/556.1 |
| 7,089,099 B2 | 8/2006 | Shostak et al. |
| 7,116,234 B2 * | 10/2006 | Mohri ........................ 340/575 |
| 7,124,004 B2 | 10/2006 | Obradovich |
| 7,258,190 B2 * | 8/2007 | Mattes et al. ............... 180/273 |
| 7,280,046 B2 * | 10/2007 | Berg et al. .................. 340/576 |
| 7,413,047 B2 * | 8/2008 | Brown et al. ................ 180/272 |
| 7,414,520 B2 | 8/2008 | Mei.beta.ner |
| 7,460,940 B2 * | 12/2008 | Larsson et al. ............. 180/272 |
| 2002/0053792 A1 | 5/2002 | Yamaguchi et al. |
| 2002/0053793 A1 | 5/2002 | Yamaguchi et al. |
| 2002/0145512 A1 | 10/2002 | Sleichter et al. |
| 2003/0023353 A1 | 1/2003 | Badaneh |
| 2003/0067148 A1 | 4/2003 | Keutz |
| 2003/0222490 A1 | 12/2003 | Sakai |
| 2004/0055806 A1 | 3/2004 | Masuda et al. |
| 2004/0209594 A1 | 10/2004 | Naboulsi |
| 2005/0021190 A1 | 1/2005 | Worrell et al. |
| 2007/0043505 A1 | 2/2007 | Leicht |
| 2008/0061954 A1 | 3/2008 | Kulas |
| 2008/0173127 A1 | 7/2008 | Ackert et al. |
| 2008/0211651 A1 | 9/2008 | Beutnagel-Buchner et al. |

FOREIGN PATENT DOCUMENTS

| | | |
|---|---|---|
| DE | 39 12 359 A1 | 10/1990 |
| DE | 39 17 613 A1 | 12/1990 |
| DE | 196 46 104 C1 | 4/1998 |
| DE | 197 34 307 A1 | 2/1999 |
| DE | 198 57 900 C1 | 6/2000 |
| DE | 199 43 595 A1 | 3/2001 |
| DE | 101 09 680 A1 | 10/2001 |
| DE | 200 14 731 U1 | 2/2002 |
| DE | 101 39 412 A1 | 3/2003 |
| DE | 203 02 628 U1 | 6/2003 |
| DE | 203 16 865 U1 | 2/2004 |
| DE | 102 41 267 A1 | 3/2004 |
| DE | 103 03 010 A1 | 8/2004 |
| DE | 103 52 733 A1 | 10/2004 |
| DE | 103 60 176 A1 | 7/2005 |
| DE | 603 13 537 T2 | 1/2008 |
| EP | 1 302 372 A1 | 4/2003 |
| EP | 1 502 835 A1 | 2/2005 |
| EP | 1 077 154 B1 | 4/2007 |
| EP | 1 378 391 B1 | 5/2007 |
| FR | 2 744 976 A | 8/1997 |
| JP | 10181380 A | 7/1998 |
| JP | 2000-020900 A | 1/2000 |
| JP | 2005135037 A | 5/2005 |
| WO | WO 98/03365 A | 1/1998 |
| WO | WO 99/52761 A1 | 10/1999 |
| WO | WO 2004/007237 A1 | 1/2004 |
| WO | WO 2004/068439 A1 | 8/2004 |
| WO | WO 2004/106145 A1 | 12/2004 |

OTHER PUBLICATIONS

Burnett, Usable Vehicle Navigation Systems: Are We There Yet?, Vehicle Electronic Systems 2000, Jun. 29-30, 2000, pp. 3.1.1-3.1.11.

Driver Focus-Telematics Working Group, Statement of Principles, Criteria and Verification Procedures on Driver Interactions with Advanced In-Vehicle Information and Communication Systems, Ver. 2.0, Apr. 15, 2002, 65 pages.

Gish et al., Sensory and Cognitive Factors Affecting Automotive Head-Up Display Effectiveness, Transp. Research Record 1694, Paper No. 99-0736, pp. 10-19.

Green, "How Long does It Take to Stop?" Methodological Analysis of Driver Perception-Brake Times, Transp. Human Factors, pp. 195-216, vol. 2, No. 3.

Hiramatsu, A Note for Common Understanding of Driver Assistance in Advanced Systems, Informal document No. WP.29-134-24, Nov. 16-19, 2004, agenda item 3.4, Geneva.

Lee et al., Can Collision Warning Systems Mitigate Distraction Due to In-Vehicle Devices?, pp. 1-9.

U.S. Department of Transportation, NHTSA, In-Vehicle Crash Avoidance Warning Systems: Human Factors Considerations, Summary Report DOT HS 808 531, Feb. 1997, 38 pages.

\* cited by examiner

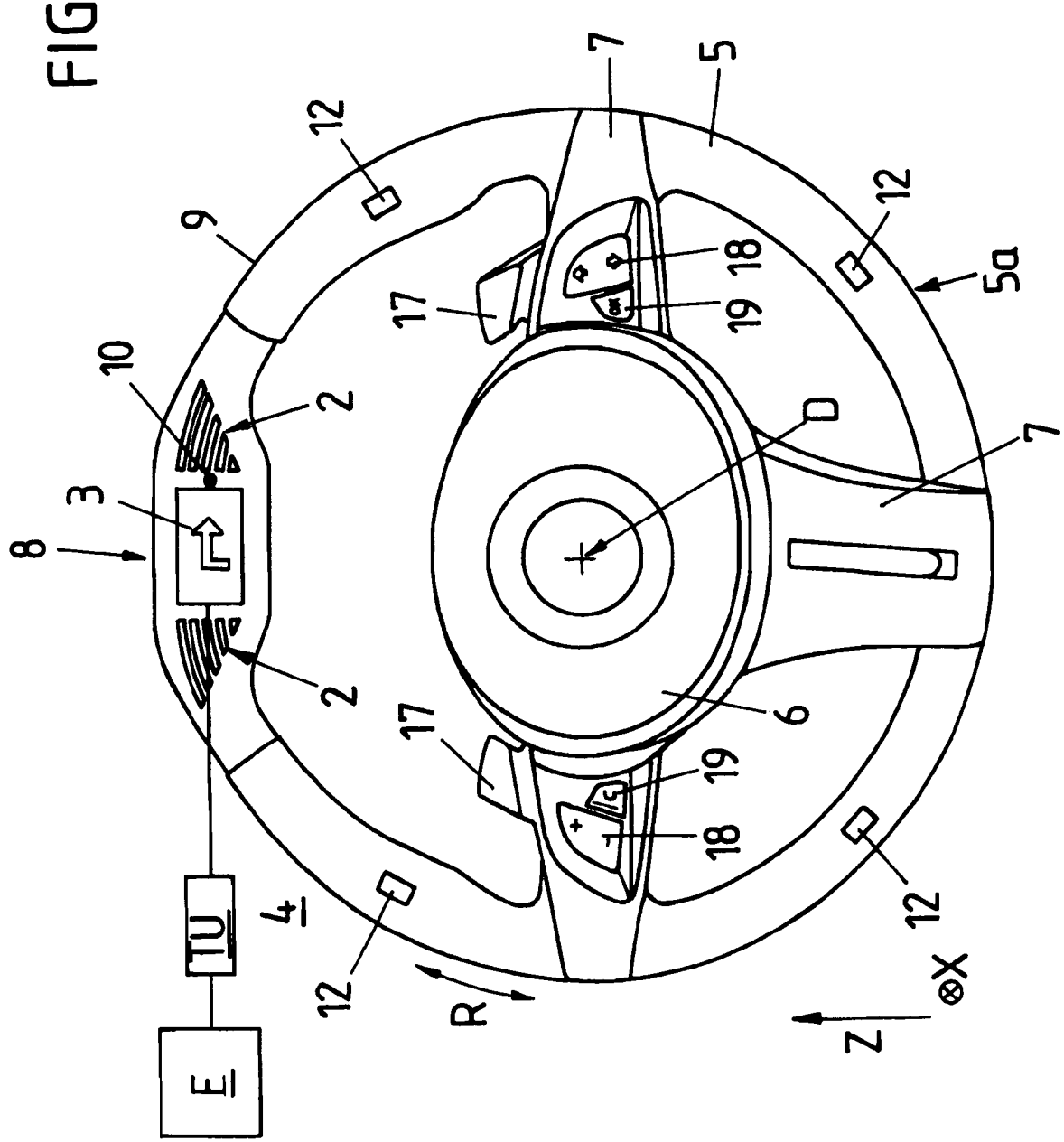

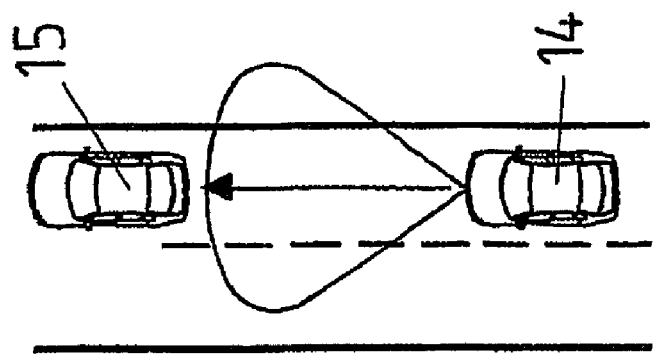
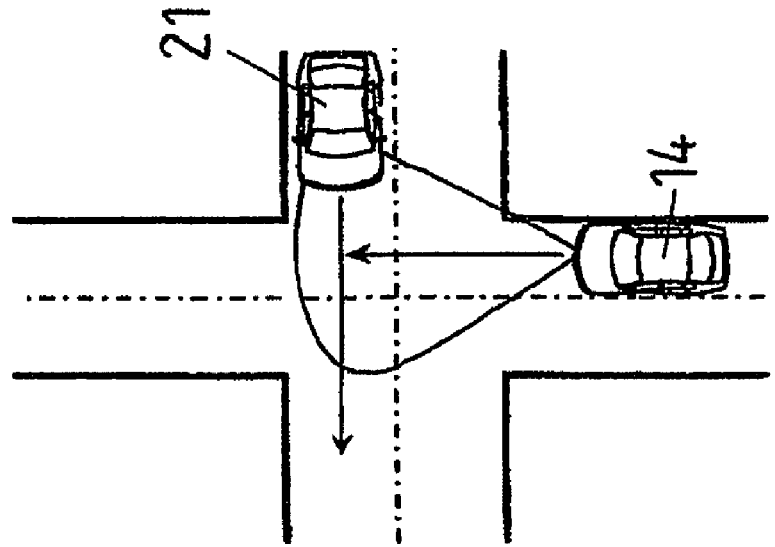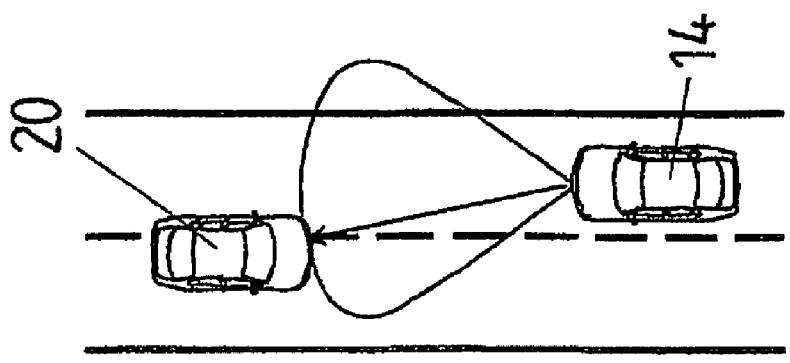

STEERING WHEEL ASSEMBLY FOR A MOTOR VEHICLE

CROSS-REFERENCE TO RELATED PATENT APPLICATIONS

This application is a continuation application of International Application PCT/DE2006/000095, which has an international filing date of Jan. 18, 2006; this International Application was not published in English, but was published in German as WO 2006/076903, both of which are incorporated herein by reference in their entirety.

BACKGROUND

The application relates to a steering wheel assembly for a motor vehicle.

Such steering wheel assemblies comprise a steering wheel with a steering wheel rim which rotates at least partially about a steering axis about which the steering wheel is rotatably mounted (transversely with respect to the steering axis), and at least one display device, arranged on the steering wheel, for displaying travel-related information of a motor vehicle, and in addition a detection device, arranged on the steering wheel, for detecting the state of attentiveness of a driver of the motor vehicle, wherein the detection device serves to actuate the display device as a function of the state of attentiveness of the driver.

EP1302372 discloses such a steering wheel assembly which has a display device which is integrated into a cover for an airbag in the region of a hub of the steering wheel of the steering wheel assembly. In this context, the airbag module must be configured in such a way that the display device is not destroyed or damaged when the airbag unfolds.

Taking this reference as a starting point, the application is therefore based on the problem of improving a steering wheel assembly of the type mentioned at the beginning to the effect that it is possible to use a conventional airbag module which has to be arranged in the hub element.

SUMMARY

This application discloses at least one display device to be arranged on the steering wheel rim. As a result, a complex structure of the airbag module, as is necessary in the case of a display device which is arranged in the region of the hub of the steering wheel, can advantageously be avoided.

The display device is preferably arranged, with respect to a state in which the steering wheel of the steering wheel assembly is installed in a motor vehicle, in a straight-ahead travel position of the steering wheel on the vertical axis of the vehicle above the steering axis, specifically in the 12 o'clock position. The display device is therefore advantageously positioned on the steering wheel rim in such a way that when the steering wheel rim is in the straight-ahead travel position it is arranged at a highest point (with respect to the vertical axis of the vehicle) of the steering wheel rim. As a result, the display device can be viewed particularly easily by a driver since the driver only has to slightly change his viewing direction compared to the straight-ahead viewing direction (parallel to the longitudinal axis of the vehicle) in order to view the display device. The display device is thus always located in the driver's field of vision so that simple (clear) visual signals can always be perceived even if the driver is not focusing on the display device.

In one further variant of the application, the detection device, for example for detecting the viewing direction of a driver, is embodied as a camera. An evaluation of an excerpt of an image which is taken by the camera is carried out using a suitable image recognition software. Alternatively, the detection device can also be a visual sensor (for example a combination of a light transmitter and a light receiver).

The detection device is preferably arranged adjacent to the display device. This is advantageous since as a result the probability of the detection device being covered by a driver's hand is reduced since a driver will generally not cover the display device, in particular a visual display, with his hands so as to not restrict its functionality.

According to one embodiment, there is provision for the detection device to be arranged on the steering wheel rim.

The detection device is particularly preferably arranged, for example in the form of a camera, in a straight-ahead travel position of the steering wheel on the vertical axis of the vehicle above the steering axis, in particular in the 12 o'clock position.

The display device preferably has at least two display elements (for example a screen and an adjacent LED array, with such a display element also being able to comprise a plurality of LED arrays), in which the detection device is particularly preferably arranged along the steering wheel rim, i.e. in a direction of rotation of the steering wheel rim, between the at least two display elements. In this context, the distance between the detection device and in each case one of the at least two display elements of the display device along the steering wheel rim is preferably smaller than the width of at least one of the two display elements along the steering wheel rim (i.e. in the direction of rotation of the steering wheel rim).

In a further variant of the application, a plurality of detection devices, in particular cameras (for example digital cameras), are provided, wherein the detection devices are preferably arranged along the steering wheel rim in such a way that at least one of the detection devices is arranged on the vertical axis of the vehicle above the steering axis irrespective of the position of the steering wheel.

The one detection device and/or the further detection devices can also advantageously be used to control other warning devices and safety devices such as, for example, a seat ramp or a motorized seat belt, as a function of the state of attentiveness of a driver.

According to one embodiment, the steering wheel has a hub element which can rotate about the steering axis and which is connected to the steering wheel rim of the steering wheel by means of at least one spoke. A region of the steering wheel rim which comprises the at least one display device is preferably provided.

Furthermore, an airbag module which is arranged on the hub element is preferably provided with an airbag which, in order to protect a driver, can unfold in a main unfolding direction running on the steering axis, and as it unfolds transversely with respect to the steering axis it can impact against the region of the steering wheel rim, with the region of the steering wheel rim preferably interacting with the airbag in such a way that in order to protect the steering wheel rim and the airbag and in particular the display device, said region is deflected in the main unfolding direction.

The region for deflecting an unfolding airbag preferably has a deflection slope, i.e. it is partially inclined with respect to a main unfolding direction of the airbag, which direction coincides with the steering axis of the steering wheel. The inclination can be embodied in such a way that the airbag strikes the region at the same angle (angle of incidence) at which it is also deflected (angle of reflection). Both angles are measured here with respect to a normal which is perpendicular to an impact region on the steering wheel rim on which the airbag impacts as it unfolds.

Furthermore, the region for deflecting the unfolding airbag preferably has a surface with a low coefficient of friction, preferably this coefficient is less than the coefficient of friction of adjoining regions of the steering wheel rim. The essential factor here is that the surface is configured in such a way that the friction between the surface and the airbag is as small as possible so that the airbag can easily slide over the region. Depending on an airbag material, the surface of the region on which the airbag is intended to slide can, for example, be made particularly smooth.

The shaping of the region of the steering wheel rim which serves to deflect the airbag or the quality of the surface of this region described above not only protects the steering wheel rim and the display device against an unfolding airbag but also the airbag itself, which further improves the safety of a motor vehicle.

In a further variant of the application, a sensor device which can be arranged in or on the motor vehicle and which is designed to detect distances between the motor vehicle and objects in the surroundings of the motor vehicle is provided.

The display device is preferably designed and provided for displaying the distances detected by the sensor device. In this context, preferably a transmission unit serves to transmit output signals of the sensor device to the display device.

The sensor device is preferably provided and designed for converting the measured distances into the size of a parking area. That is to say the sensor device is intended to be used to determine the size of a parking space (parking area), or to determine whether the parking area is sufficient to position, i.e. to park, the car on it. Such a parking area may be, for example, a parking gap between two vehicles which are positioned along a road, with the sensor device being able to determine the distance between the two vehicles along the road as it travels past, and thus automatically determine or estimate the size of the parking area (parking gap). Furthermore, the sensor device is preferably provided and designed for displaying information about a parking area by means of the display device, for example whether a measured parking area is large enough to position the motor vehicle on it.

The determination of the distances between the motor vehicle and objects in the surroundings of the motor vehicle permits safe parking since, owing to the knowledge of the dimensions of the parking area, risk of collision with an adjacent object is reduced. The comfort of the motor vehicle is advantageously improved.

An idea of the application here is that the sensor device can also be used for other functions. That is to say during normal straight-ahead travel above a specific (predefinable) threshold speed it is possible to use the sensor device to sense the distance from vehicles or objects which are traveling ahead or are oncoming and to control a collision warning device (for example visual display, acoustic indicator and/or haptic indicator) while in the case of slow travel at a speed below the threshold speed it is possible to use the same sensor device to determine and measure potential parking areas for the motor vehicle.

In a further exemplary embodiment of the application, the display device is provided and designed for displaying a speed limit. An activation device which is arranged in the vicinity of the steering wheel is preferably provided and is designed to activate a cruise controller which limits the speed of the motor vehicle to the speed limit indicated by means of the display device.

In order to adopt the speed limit indicated by the display device it is sufficient, in particular, to activate the activation device once. Said activation device can be embodied, for example, as a push button switch which is pressed once to activate the cruise controller or to confirm the speed limit indicated by means of the display device.

In this way it is possible to activate the cruise controller comfortably, while at the same time the driver's attention is not distracted from the traffic owing to the display of the speed limit in the driver's field of vision, which enhances the safety of the motor vehicle overall.

The instantaneous speed limit can be fed to the steering wheel assembly via an optical sensor which can read road signs and other displays. Alternatively or additionally it is also possible to read the speed limit from a GPS database and/or to determine it by means of an RFID and transfer it to the steering wheel assembly.

Furthermore, the cruise controller preferably regulates the speed of the motor vehicle to the speed limit which is displayed by means of the display device. That is to say the cruise controller brings about an essentially constant speed which can correspond to the current speed limit.

Furthermore, the activation device is preferably arranged on the steering wheel. The steering wheel can, for example, have a hub element which is mounted so as to rotate about a steering axis and on which a steering wheel rim which at least partially rotates the hub element transversely with respect to the steering axis can be attached by means of at least one spoke. The activation device can then be attached to the spoke, the steering wheel rim and the hub element. The activation device is advantageously attached to the steering wheel in such a way that it can be activated by a driver without the driver having to take his hands off the steering wheel.

Furthermore, it is of course also possible to predefine a distance from a vehicle traveling ahead as a controlled variable, in which case, as it predefines a distance to be maintained from a vehicle traveling ahead, the cruise controller regulates the speed in such a way that the distance corresponds essentially to the predefined distance, i.e. is kept contact by the cruise controller. The instantaneous distance from a vehicle traveling ahead can be measured here continuously by means of the sensor device.

A further exemplary embodiment of the application provides an interface which is arranged on the steering wheel and via which at least an instantaneous rotational speed of an engine and/or a gear speed of a transmission of the motor vehicle can be transmitted to the display device in order to display the rotational speed and/or the gear speed.

According to one embodiment, the functional unit is embodied as an electronic evaluation system which is connected to the display device and is designed and provided for determining the proposal relating to a gear speed to be used, at least as a function of the instantaneous rotational speed and the instantaneous gear speed, and for displaying it to a driver via the display device.

In this context, the acceptance of the proposal by the driver by means of the activation device brings about automatic engagement of the proposed gear speed in motor vehicles with an automatic transmission.

The display device is particularly advantageously embodied as a visual display. In this context, the visual display has preferably at least one LED (light emitting diode).

The visual display is also preferably formed by a plurality of LEDs and preferably has an LED array whose LEDs can be activated in such a way that graphic symbols can be represented (corresponding to the number of LEDs). Such an LED array can also be embodied in the form of rows.

In one particularly preferred variant of the application, the visual display has at least one screen. This is preferably an LCD. However, it is also possible to use other display technologies.

In one alternative embodiment, the display device is embodied as an acoustic indicator or haptic indicator. It is of course possible to combine visual displays, acoustic indicators and haptic indicators with one another. Haptic indicators are, for example, vibrators which are preferably arranged on the steering wheel rim. So that the latter can be felt in any grip position, such a haptic indicator can surround the steering wheel rim in an annular shape (in the direction of rotation of the steering wheel rim in which the steering wheel rim can be rotated). Haptic indicators are advantageously arranged on those regions of a motor vehicle which are continuously in contact with a person, in particular the driver (steering wheel, seat etc.)

The further idea of the application provides a method for actuating a display device using a steering wheel assembly according to the application in which the state of attentiveness of a driver is detected using at least one of the detection devices and in which the display device is actuated to display travel-related information as a function of the detected state of attentiveness.

One variant of the method provides that in a detection device in the form of a camera it is automatically checked whether the camera is restricted in its function by a lens of the camera being covered, in which case, if the lens of the camera is covered the functional capability of the camera which is restricted as a result of this is indicated to the driver by means of the display device.

It is to be understood that both the foregoing general description and the following detailed description are exemplary and explanatory only and are not restrictive of the invention as claimed.

BRIEF DESCRIPTION OF THE DRAWINGS

These and other features, aspects, and advantages will become apparent from the following description, appended claims, and the accompanying exemplary embodiments shown in the drawings, which are briefly described below.

FIG. 2 shows a plan view of a steering wheel assembly according to the device shown in FIG. 2 and FIG. 3, with an LCD (display device) in the steering wheel rim.

FIGS. 4a-4c are technical illustrations of possible collisions with an oncoming vehicle on an adjacent lane, with a vehicle on an intersecting lane and with a vehicle traveling ahead on the same lane.

DETAIL DESCRIPTION

Figure 1:
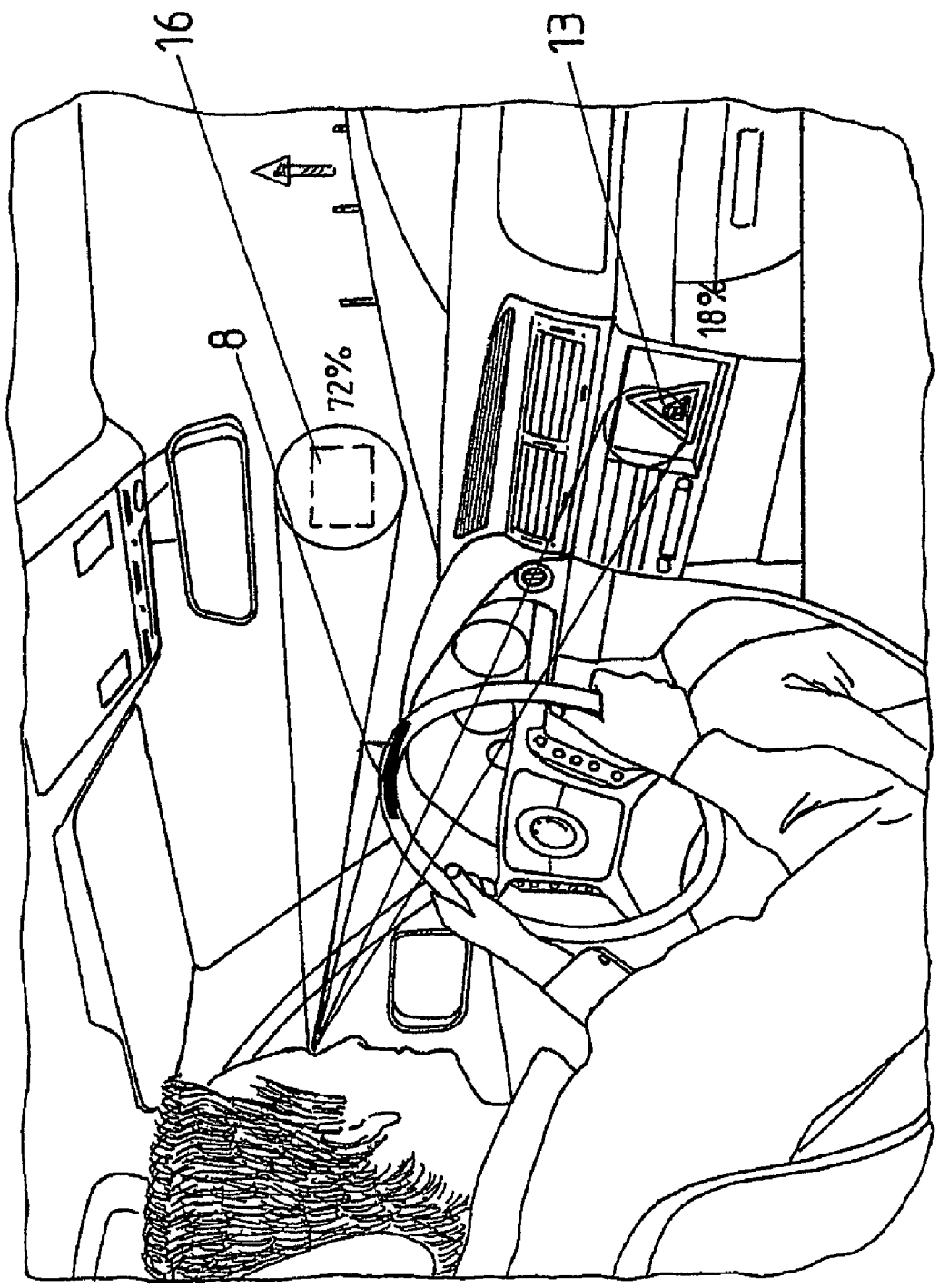
FIG. 1 is a perspective illustration of the viewing directions of a driver in the case of known communication interfaces and in a variant of a steering wheel assembly according to the application, with a display device which is arranged in a steering wheel rim.

FIG. 2 shows a plan view of a steering wheel assembly 4 with a steering wheel 5a which has a steering wheel rim 5 and a hub element 6 which is connected to the steering wheel rim 5 via three spokes 7.

The hub element 6 is mounted so as to be rotatable about a steering axis D which is perpendicular to the plane of the paper and about which the steering wheel rim 5, which is of annular design, rotates transversely with respect to the steering axis D in the direction R of rotation of the steering wheel rim 5. The three spokes 7 are essentially arranged in a T shape, with, with respect to an installation state of the steering wheel 5a, in a straight-ahead travel position of the steering wheel rim 5 one of the three spokes 7 running essentially on the vertical axis z of the vehicle (the steering wheel 5a can be inclined with respect to the vertical axis z of the vehicle or have an adjustable inclination), while the two other spokes 7 protrude horizontally in opposite directions from the hub element 6 and divide the steering wheel rim 5, with respect to its straight-ahead travel position, into a half which runs above the steering axis D and a half which runs below the steering axis D.

The steering wheel assembly 4 has a display device 8 in the form of a visual display for displaying travel-related information. A first display element of the display device 8 is embodied as a rectangular screen 3, specifically as an LCD (liquid crystal display) which (in the straight-ahead position of the steering wheel rim 5 shown in FIG. 2) is arranged in the upper half of the steering wheel rim 5, specifically essentially in such a way that with respect to the straight-ahead travel position of the steering wheel rim it is arranged at the highest point (with respect to the vertical axis z of the vehicle) of the steering wheel rim 5, i.e. in the 12 o'clock position. In this context, the screen 3 is let into an upper side of the steering wheel rim 5 which faces a driver so that it is opposite the driver on the longitudinal axis x of the vehicle and faces the driver.

The screen 3 is arranged along the steering wheel rim 5, i.e. in the direction R of rotation of the steering wheel rim 5, between two further display elements of the display device 8 which are each formed from five LED arrays 2. The LED arrays 2 are formed extended longitudinally in the direction R of rotation (in the form of a row), in which case, in the straight-ahead travel position of the steering wheel rim 5, the respective five LED arrays 2 are arranged one on top of the other on the vertical axis z of the vehicle and become wider toward an external circumferential edge 9 of the steering wheel rim 5 (in the direction R of rotation), i.e. the longitudinal extent of the LED arrays 2 in the direction R of rotation grows as the radial distance from the hub element 6 of the steering wheel 5a increases.

Figure 8:
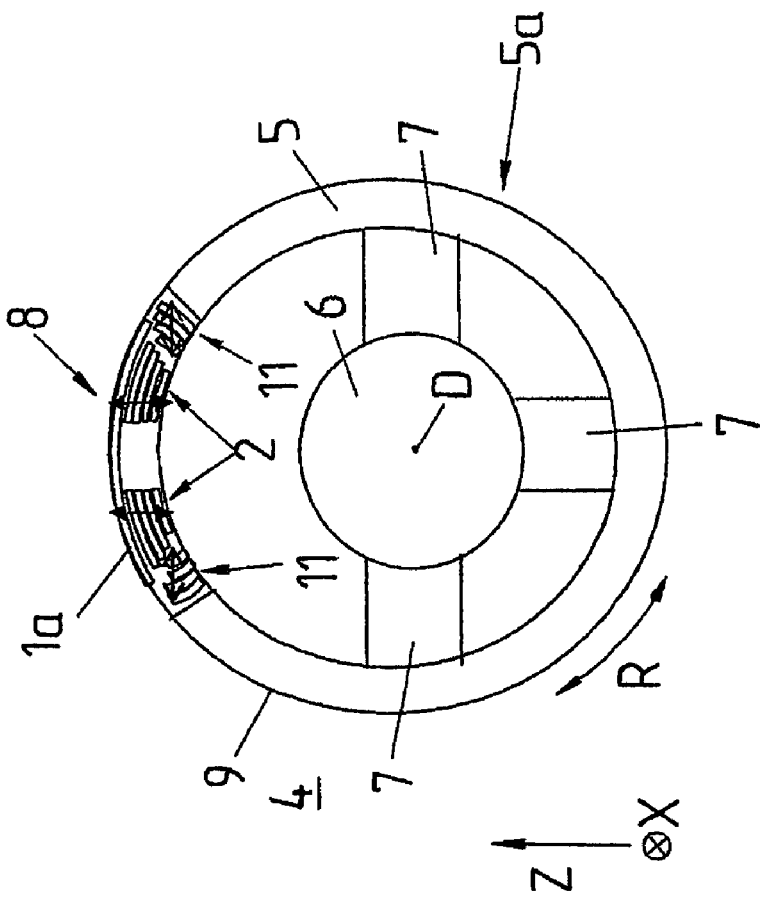
FIG. 8 shows a refinement of a steering wheel assembly of the type shown in FIG. 2.

FIG. 8 shows a plan view of a refinement of the steering wheel 5 which is shown in FIG. 2 and in which, in contrast to FIG. 2, a further LED array 1 of arcuate design extends along an outermost circumferential edge 9 of the steering wheel rim 5 (in a radial direction which is perpendicular to the axis D of rotation), specifically essentially over the entire upper half of the steering wheel rim 5. The LED array 1 is divided in the direction R of rotation into three segments 1b, 1a and 1c which are of approximately equal length, with the central segment 1a being arranged on the vertical axis z of the vehicle (in the straight-ahead travel position of the steering wheel rim 5) above the screen 3 and the LED arrays 2 (in each case four are arranged on each of the two sides of the screen 3 in the direction R of rotation). Each of these segments 1a, 1b and 1c can be activated separately to display travel-related information.

Figure 9:
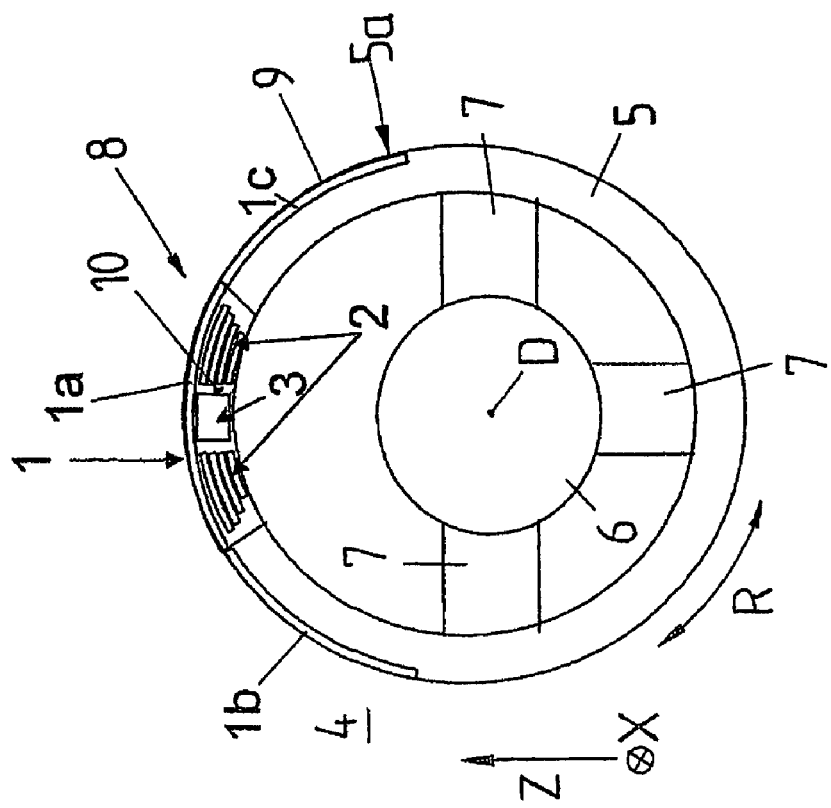
FIG. 9 shows a refinement of a steering wheel assembly of the type shown in FIG. 8.

FIG. 9 shows a further refinement of the steering wheel assembly 4 which is shown in FIG. 8 and in which, in contrast to FIG. 8, no screen 3 is provided (this can of course also be used here) and the further LED array 1 has merely the central segment 1a. Furthermore, no camera 10 is provided but it is also possible to use one here. In addition, on opposite sides of the LED arrays 2 it is possible to arrange in each case four additional LED arrays 11 which are arranged transversely with respect to the direction R of rotation on the upper side of the steering wheel rim 5. These additional LED arrays 11 can be activated separately and serve in particular to display warning signals which indicate that the vehicle is leaving the lane (transversely with respect to the direction of travel). If, for example, the vehicle leaves the lane over the right-hand marking (in the direction of travel) of the lane, this is detected by a sensor and transmitted to the electronic control system which correspondingly activates one of the additional LED arrays 11 on the right-hand side (with respect to the direction of travel) of the steering wheel rim 5. Depending on how far the vehicle leaves the lane, further additional LED arrays 11 can be activated on the right-hand side of the steering wheel rim 5.

A driver is considered to be attentive or in a state of attentiveness if he observes the surrounding traffic and the surroundings. In order to detect a state of attentiveness of the driver, according to FIG. 2 and FIG. 8 a detection device 10 in the form of a camera is arranged in the direction R of rotation between the screen 3 and the LED arrays 2 which are arranged one on top of the other and which are themselves arranged on the right-hand side of the screen 3 with respect to the straight-ahead travel direction (from the driver's point of view).

Important indicators for the state of attentiveness of the driver are, for example, his viewing direction and the position of his eyes. The state of attentiveness can be classified here, for example, by reference to the deviation of the viewing direction from the straight-ahead viewing direction (observation of the road users traveling ahead) and/or the position of the eyes (open, closed). Both the viewing direction and the position of the eyes can be detected by means of the camera 10 and therefore used to control the display elements of the display device 8 which are described above.

There is provision here for the display elements of the display device 8 to be activated in order to warn a driver about a lack of attentiveness (for example if the driver's eyes are closed for longer than a predefinable time period and/or the viewing direction of the driver deviates from a straight-ahead viewing direction for longer than a specific time period).

In order to increase the ability to perceive visually warning signals which have been generated by means of the display elements, there is a particular provision for the LED arrays 2 or the further LED array 1 to be provided and designed for lighting up with various frequencies and/or intensities, i.e. brightness levels. Alternatively or additionally it is possible for texts and/or symbols to be displayed by means of the screen 3 in order to warn the driver.

Furthermore, in order to warn the driver, it is possible to use haptic signals which can be generated, according to FIG. 2, by means of vibrators 12 which are arranged in the steering wheel rim 5. So that the haptic signals which are generated by means of the vibrators 12 can be felt by a driver in any conceivable gripping position, they are arranged distributed along the steering wheel rim 5 in the direction R of rotation or alternatively extend in the direction R of rotation over the entire circumference of the steering wheel rim 5. Such vibrators 12 can also be used in a motor vehicle seat which is assigned to the driver. The use of haptic indicators in the form of vibrators 12 which are arranged in the steering wheel rim 5 is provided in particular to warn a driver that his vehicle is leaving a lane laterally. Furthermore, it is of course also possible to use acoustic signals to warn the driver.

The display device 8 of the steering wheel assembly 4 is always present in the field of vision of a driver owing to its arrangement on the steering wheel rim 5. It is known that if a conventional navigation system is used with a known communications interface 13 according to FIG. 1, arranged on the centre console underneath the dashboard, the communications interface 13 (combination of visual display and operator control unit) is viewed for only approximately 18% of the travel time while an average driver looks in the straight ahead travel direction (straight-ahead viewing direction) for approximately 72% of the travel time so that the display device 8 of the steering wheel assembly 4 is in a driver's field of vision for approximately 72% of the travel time. As a result, a driver can be warned and informed better in hazardous situations by means of the display device 8, while at the same time his attention is distracted less from the surrounding events on the road since the display device 8 is positioned in a more central location in the field of vision than a known central communications interface 13. As a result, accidents can be avoided or effectively reduced by warning a driver in good time.

Furthermore, the display device 8 of the steering wheel assembly 4 has, compared to a known HUD 16 (head up display, i.e. a display which is projected onto the front windscreen of a motor vehicle) according to FIG. 1, the advantage that it is adversely affected to a lesser degree by environmental influences (for example direct solar radiation in the opposite direction to the straight-ahead travel direction).

Furthermore, the steering wheel assembly 4 according to FIG. 2 has activation devices which are not shown in FIGS. 8 and 9. These are two activation levers 17 which are each formed and arranged on the horizontally extending spokes 7 of the steering wheel assembly 4 such that they can be activated by a driver, for example by pressing with a thumb, on the longitudinal axis x of the vehicle. By means of these activation levers 17 it is possible, for example, to activate or deactivate a travel direction indicator of a motor vehicle. Furthermore, each of the two horizontally extending spokes 7 (horizontal with respect to the straight-ahead travel position of the steering wheel rim 5) has in each case a rocker-like activation element 18 which can be activated at two ends which lie opposite one another, specifically by pressing on the longitudinal axis x of the vehicle. In this way it is possible to make a selection from a menu which is displayed on the screen 3 by, for example, moving (scrolling) a selection region (cursor) upward or downward (along the vertical axis z of the vehicle in the straight-ahead travel position of the steering wheel rim 5) with one of the two activation elements 18, while the selection field can be moved to the left or to the right with the respective other activation element 18 (in the straight-ahead travel position of the steering wheel rim 5 as viewed by a driver).

Furthermore, on each of the two horizontal spokes 7 there is a simple pushbutton switch 19, with one of the two pushbutton switches 19 being preferably used to confirm a specific selection, while the other serves to reject a selection or option which is displayed by the display device 8.

Figure 3A:
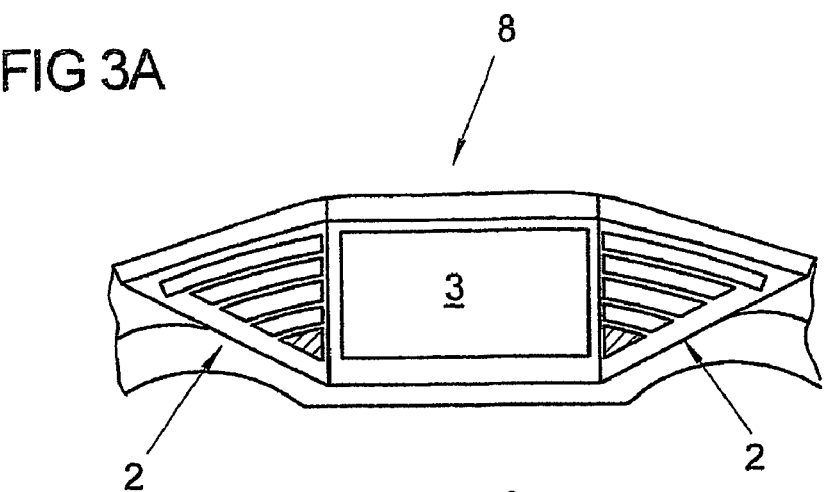
FIGS. 3a-3d show a display device (LCD) of the type shown in FIG. 2, which displays visual signals for warning against an excessively small distance from a vehicle traveling ahead.
Figure 3B:
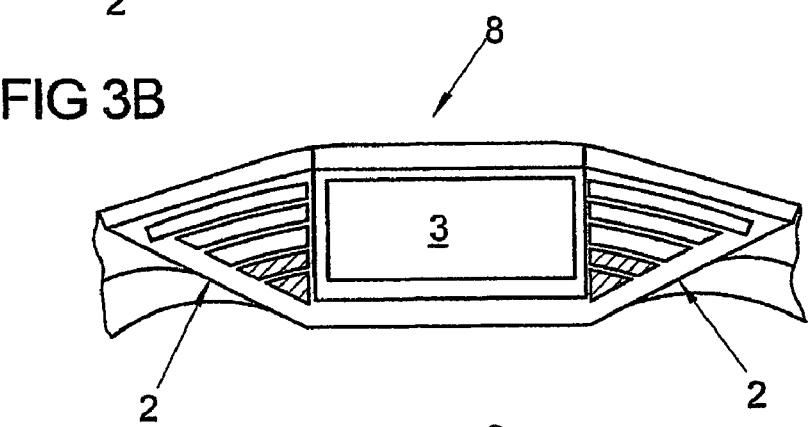
Figure 3C:
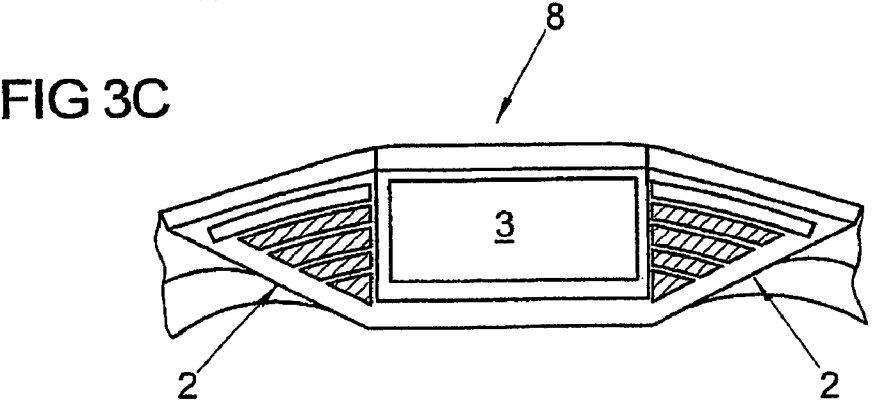
Figure 3D:
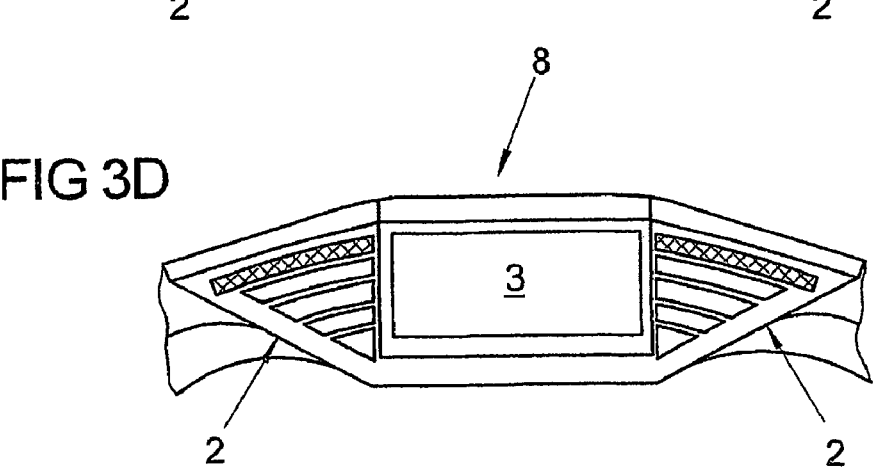
Figure 5:
FIG. 5 is a perspective illustration of a driver in the cockpit of a motor vehicle, where the driver's attention has been distracted on to the road (straight-ahead viewing direction) by the steering wheel assembly according to the application.

The LED arrays 2 of the display device 8 which are arranged vertically one on top of the other according to FIGS. 2, 8 and 9 of the steering wheel assembly 4 are preferably used for warnings of collisions or for distance signals. In this context, at least three cases are distinguished from one another. Firstly, in the case of a vehicle 15 which is traveling ahead on the same lane according to FIG. 4c the distance from this vehicle 15 can be displayed by means of the LED arrays 2 according to FIGS. 3a to 3d, in which case when the distance undershoots a specific value the LED arrays 2 which are located closer to the hub element 6 on the two sides of the screen 3 are activated first (FIG. 3a) and then LED arrays 2 (FIGS. 3b to 3c) which are arranged above them on the vertical axis z of the vehicle—with respect to a straight-ahead travel position of the steering wheel—are activated successively as further (respectively smaller) distances are undershot (FIGS. 3b to 3c). When there is an acute risk of a collision, the uppermost LED arrays 2 (FIG. 3d) on the vertical axis z of the vehicle—with respect to a straight-ahead position of the steering wheel rim 5—are activated, or in the case of a steering wheel 5 of the type shown in FIG. 8 or 9 preferably the further LED array 1 on the outer, circumferential edge 9 of the steering wheel rim 5 is activated. The uppermost LED array 2 or the further LED array 1 is preferably designed to emit a red light in order to warn a driver in the way described above.

Such a collision warning is also displayed in the case of an oncoming vehicle 20 which, according to FIG. 4a, changes from an adjacent lane into the lane in which the vehicle 14 with the steering wheel assembly 4 is traveling. Furthermore, such warning signals are also activated when there is the threat of a side collision with a vehicle 21 which intersects the lane of the motor vehicle 14 according to FIG. 4b.

Speed warnings on bends can also be displayed by means of the screen 3. In this context, a sensor system calculates the curvature of a bend lying ahead and from it calculates a maximum speed at which the vehicle can still travel around the bend without risk. If the speed of the motor vehicle is above this, the speed warning on a bend, for example in the form of a pictogram according to FIG. 9, is activated.

Furthermore, by means of the screen 3 of the steering wheel assembly 4, information which has been determined by means of a navigation system, for example a route, can be displayed. In particular before the vehicle turns off the road it is possible to display a change in the direction of travel by means of the screen 3, for example by displaying an arrow according to FIG. 2 which points in the future direction of travel.

Figure 7:
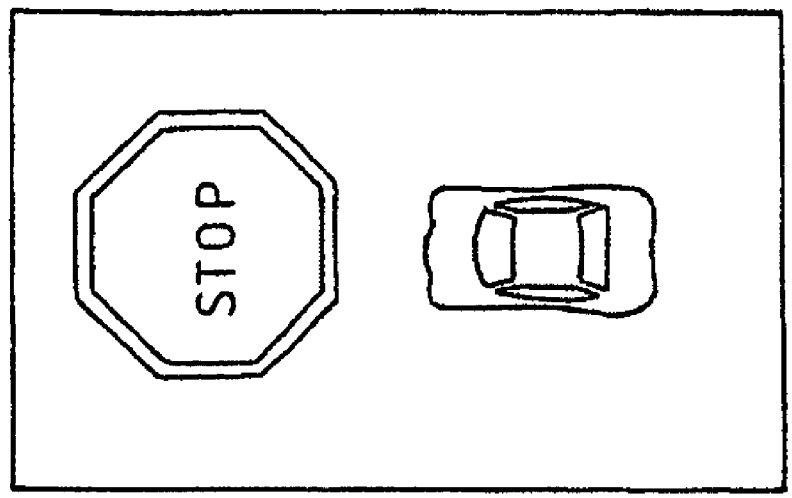
FIG. 7 shows a detail of a display device which displays a visual warning signal for warning against driving through a stop sign.
Figure 6:
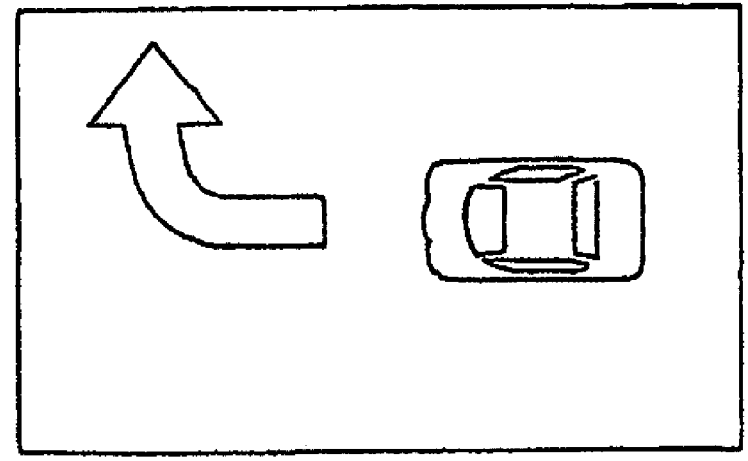
FIG. 6 shows a detail of a display device which displays a visual signal for a speed warning on a bend.

Furthermore there is provision for a sensor system, for example a camera, to detect stop signs in the surroundings of a motor vehicle. Said signs are displayed on the screen 3 as a pictogram according to FIG. 7, in which case, if appropriate, a braking warning is displayed, for example by means of the further LED array 1 or one of the LED arrays 2. The further LED array 1 or one of the LED arrays 2 is preferably designed to emit a red light for this purpose.

The display device 8, in particular the screen 3, can of course also be used to display a tire pressure of a motor vehicle and the petrol level in a fuel tank of a motor vehicle and/or can display a corresponding warning or an indication if there is a lack of tire pressure or a lack of petrol. A driver can advantageously also be reminded, by means of the screen 3, to put his seatbelt on.

A limiting value of the speed of a motor vehicle (speed limit), which is transmitted to the steering assembly 4 by means of a transmission unit TU (not shown in FIG. 8) can particularly advantageously be displayed by means of the screen 3 according to FIG. 2 and FIG. 8, it being possible to determine said limiting value by means of a sensor device E which is provided for this purpose and which is arranged in or on the motor vehicle. The sensor device E may read off the limiting value of the speed here by means of visual sensors from road signs arranged along a route. Alternatively or additionally the sensor device E is designed to read off the current limiting value of the speed from a GPS database in which such information is stored.

A limiting value of the speed which is determined by the sensor device E on an up to date basis is displayed to a driver initially by means of the screen 3. The driver can then decide whether he accepts the proposed limiting value for the speed and thus hands over to a cruise controller which consequently limits or adjusts the speed of the vehicle to the accepted limiting value of the speed, or whether he rejects the currently determined limiting value of the speed.

The activation device 17, 18, 19 of the steering wheel assembly 4 which is coupled to the cruise controller and the display device is used to accept or reject the proposal, the limiting value which is determined for the speed being preferably accepted by activating the activation device 17, 18, 19 once, for example by pressing on one of the two pushbutton switches 19.

The driver also has the possibility of changing, i.e. of increasing or lowering, the limiting value for the speed proposed by means of the screen by using the activation device. The activation levers 17 and/or the activation elements 18, for example, can be designed and provided for this purpose.

Furthermore, a tolerance range of the limiting value of the speed which is provided by the cruise controller can be set and activated in terms of absolute value by means of the activation device 17, 18, 19. The tolerance range is the speed range around which the speed of the motor vehicle is supposed to deviate from the detected limiting value for the speed. The driver can thus, for example, make a setting such that the limiting value for the speed which is transferred to the display device from the outside is always to be exceeded by 10%.

Furthermore, the screen 3 is designed to display the instantaneous rotational speed of an engine and/or of the gear speed used from a motor vehicle transmission. In this exemplary embodiment the sensor device E is designed and provided for determining the instantaneous rotational speed and the current gear speed of the motor vehicle.

A functional unit in the form of an electronic evaluation system calculates from the detected rotational speed, as a function of the instantaneous gear speed, a proposal for a gear speed which is to be used and which can be displayed by means of the screen 3 and, for example, accepted or rejected by a driver by the pressing of a button (pushbutton switch 19). The proposal can be dependent on further parameters which can be set by means of the activation device 17, 18, 19 of the steering wheel assembly 4 (for example desired driving style such as sporty, economical etc.).

Furthermore, the screen 3 can also be advantageously used to display to a driver the maneuver with which he can park in a selected parking space (parking area). This is used by the sensor device E, for example as it travels past, to measure and classify, i.e. it is automatically detected whether parking is possible in view of the size of the parking area.

Figure 10:
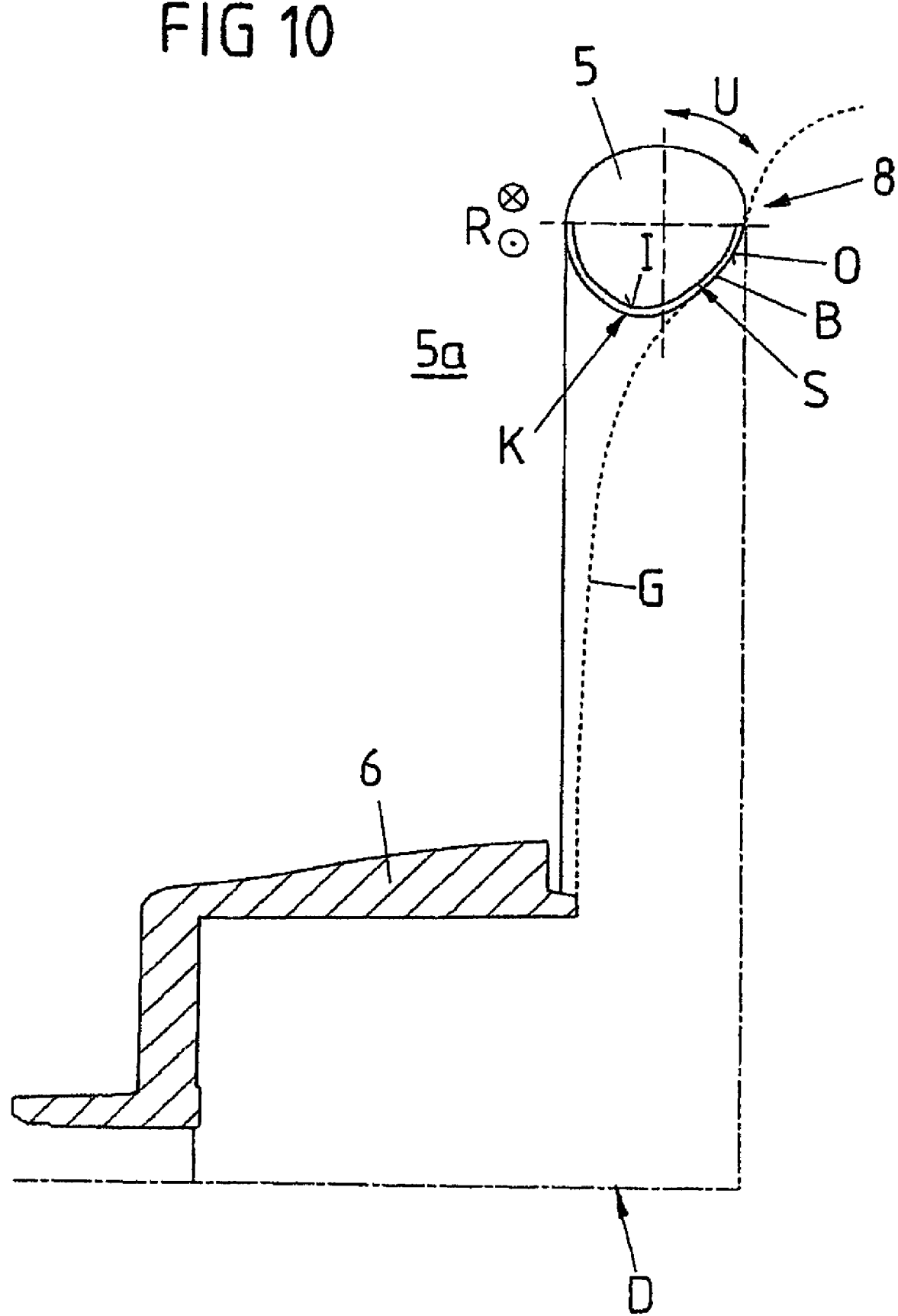
FIG. 10 shows a schematic sectional illustration of a steering wheel of a steering wheel assembly according to the application with a region for deflecting an unfolding airbag.
Figure 11:
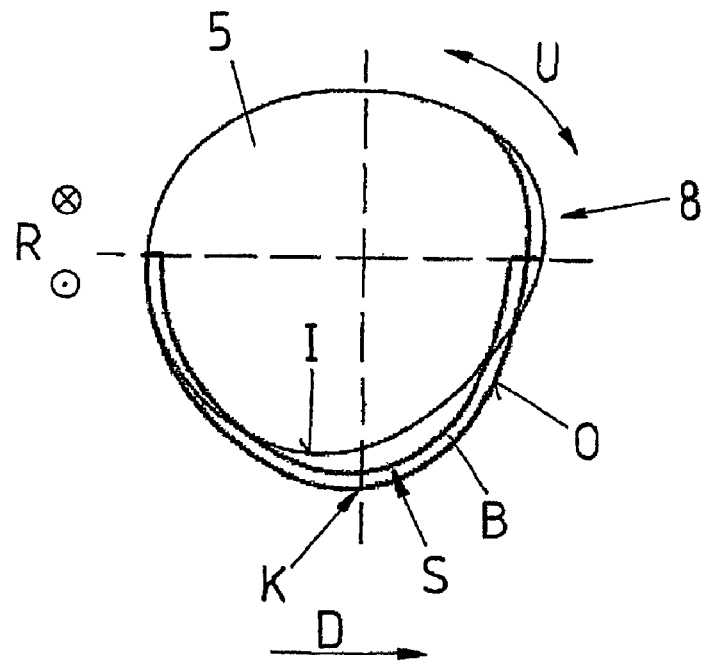
FIG. 11 shows a schematic sectional illustration of a steering wheel rim of the steering wheel shown in FIG. 10.
Figure 12:
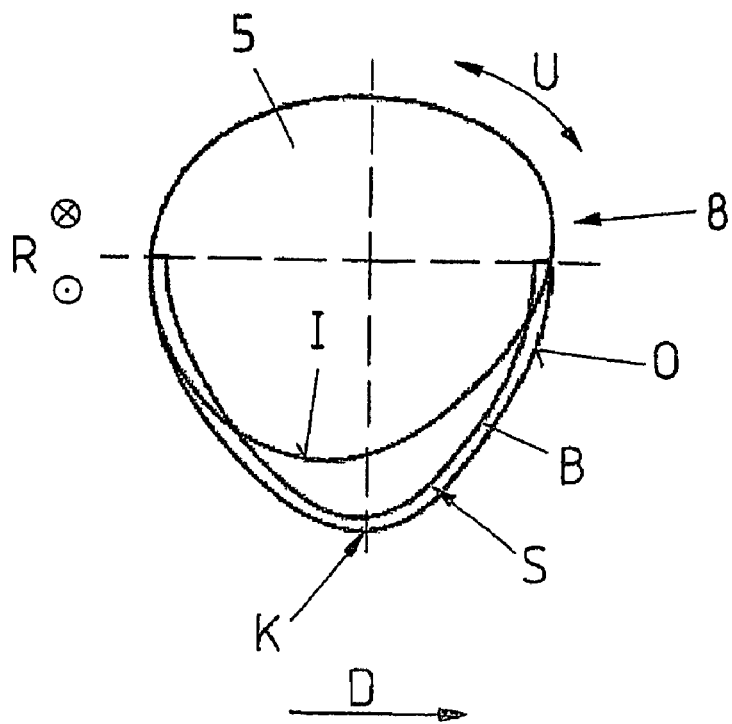
FIG. 12 shows a schematic sectional illustration of a refinement of the steering wheel rim shown in FIG. 11.

FIG. 10 shows, in conjunction with FIG. 11 and FIG. 12, a schematic sectional illustration of a detail of a steering wheel 5a of a steering wheel assembly 4 of the type shown in FIGS. 2, 8 and 9, where the steering wheel rim 5 of the steering wheel 5a which surrounds the hub element 6 in an annular fashion transversely with respect to the steering axis D. The steering axis D lies in each case in the sectional plane of FIGS. 10 to 12.

The hub element 6 forms a receptacle for an airbag module which has an airbag G (part of the airbag G is indicated by a dashed line in FIG. 10) which can be unfolded in a main unfolding direction, which coincides with the steering axis D, in order to protect a driver. For this purpose, the airbag G is inflated by means of a gas generator (not shown) of the airbag module, with the airbag G penetrating or blowing off a cover cap (not shown) of the hub element 6 and unfolding in the main unfolding direction, i.e. between the steering wheel 5a and the driver, in order to protect a driver. In the inflated state, the airbag G can be formed symmetrically with respect to the steering axis D or with respect to the main unfolding direction and has a spatial extent both along the steering axis D and transversely with respect to the steering axis D. By filling it with gas which is made available by the gas generator, the gas sack G is made to unfold, in which case it extends transversely with respect to the steering axis D and can impact against a region B of the steering wheel rim 5 which lies opposite the steering axis D transversely with respect to the steering wheel axis D. This may occur, for example, if the airbag G cannot unfold freely, that is to say for example in situations in which the driver is located too closely in front of the steering wheel 5 on the steering axis D (OoP situation).

In order to ensure that an airbag G which impacts on the region B is deflected, specifically in such a way that the airbag G does not damage the steering wheel rim 5, in particular the display device 8 which is arranged on the steering wheel rim 5 or the region B, the region B has a deflection slope, i.e. it is inclined with respect to the steering axis D. This inclination is embodied in such a way that the airbag G impacts on the region B at an angle of incidence which is in absolute terms essentially the same as an angle of reflection at which it is deflected by the region B. So that this is possible over the largest possible region along a circumferential direction U which runs around the steering wheel rim 5 in an annular fashion transversely with respect to the direction R of rotation, the region B additionally has a convex curvature.

In addition, the region B has a surface O which faces the hub element 6 and, if appropriate, a driver and which is constructed in such a way that the airbag G can easily slide over it (low friction). Furthermore, the region B can be restricted to the surroundings of the display device 8 and can extend in the direction R of rotation and/or in the circumferential direction U along the display device 8. However, it can also run around the steering wheel rim 5 or the steering axis D in an annular shape in the direction R of rotation.

The region B of the steering wheel rim 5 which is formed as described above, can be formed on one or more shell elements S which are arranged on an inner side 1 of the steering wheel rim 5 facing the hub element 6.

In a sectional plane in which the steering axis D lies these shell elements S have a contour which deviates, in the region of the display device 8, from the contours with respect to the display device 8 in the direction R of rotation of spaced-apart sections of the steering wheel rim 5. However, it is also possible for the contours in the region of the display device 8 to essentially correspond identically to the other contours of the steering wheel rim sections which are spaced apart from the display device 8 in the direction R of rotation. As an alternative to the shell elements S, it is also possible to provide a foamed element around the steering wheel rim 5 along the display device 8 on the steering wheel rim 5, said foamed element having a correspondingly embodied region B for deflecting the airbag G.

The shell element S which is shown in FIG. 11 has, in the region B of the shell element S which faces the hub element 6 and a driver, a convex curvature which is more highly curved than a region of the steering wheel rim 5 which faces and lies opposite the region B, in which case, in contrast to FIG. 12, the shell element S which has a U-shaped cross section according to FIG. 11 has a higher degree of curvature in the region B than in a region of the shell element S which lies opposite the region B on the steering axis D. As a result, the shell element S which is shown in FIG. 11 has, on the steering axis D, a smaller maximum width than the steering wheel rim 5 so that the latter projects along the steering axis D beyond the shell element S.

The refinement of the shell element S which is shown in FIG. 12 is likewise of U-shaped construction in cross section, i.e. convexly curved and embodied symmetrically along an axis which runs transversely with respect to the steering axis D, with the maximum width of this shell element S corresponding in terms of absolute value to that of the steering wheel rim 5 on the steering axis D. At the free ends of the shell element S, an outer surface of the shell element S which faces away from the steering wheel rim 5 is fitted flush into an outer surface (pointing outwards) of the steering wheel rim 5 and extends tangentially with respect to it so that a smooth transition is ensured between the shell element S and the steering wheel rim 5. This is advantageous since as a result edges, which could damage the airbag G when it impacts on the region B, are avoided from the outset.

It is decisive that both embodiments of the shell element S have a curvature such that the region B which is inclined with respect to the steering axis D (and is curved transversely with respect to the steering axis D) is formed, said region B ensuring that the unfolding airbag G is deflected. It is advantageous if the U-shaped cross-sectional contour of the shell elements S according to FIGS. 11 and 12 has a rounded point K which points essentially to the hub element 6, i.e. has a convexly curved region which faces the hub element 6 and has the greatest curvature of the cross sectional contour (the U-shaped cross sectional contour of the shell element S can, for example, be a semi-ellipse), the region B of the shell element S being arranged on the steering axis D between this point K and a driver. As a result, the unfolding airbag G can advantageously be deflected on the steering axis D by the region B.

Furthermore, the shell element or elements S can partially or completely cover the display device 8, and can be of transparent design in the case of a visual display device 8. As an alternative to this, the shell elements S can be arranged along the steering wheel rim 5 to the right and left of a display device 8 which is arranged on the steering wheel rim 5, i.e. they surround the display device along the steering wheel rim 5. As a result, the display device 8 is protected since the shell elements S according to FIGS. 11 and 12 protrude from the steering wheel rim 5 in the region B and thus project beyond a display device 8 which is arranged in the steering wheel rim 5, or let in there, i.e. are arranged between the display device 8 and an unfolding airbag G. This protective function is supported by the inclination of the region B with respect to the steering axis D (i.e. the region B forms a deflection slope) and the curvature of the region B which ensures deflection of an unfolding airbag G.

What is claimed is:

1. A steering wheel assembly for a motor vehicle, having:
a steering wheel rotatably mounted about a steering axis;
a steering wheel rim for activating the steering wheel;
at least one display device, arranged on the steering wheel, for displaying travel-related information of a motor vehicle; and
at least one detection device, arranged on the steering wheel, for detecting the state of attentiveness of a driver of the motor vehicle, wherein the detection device serves to actuate the display device as a function of the state of attentiveness of the driver, characterized in that, in a straight-ahead travel position of the steering wheel, the display device is arranged on the steering wheel rim along the vertical axis of the vehicle above the steering axis, and in that, in a straight-ahead travel position of the steering wheel, the detection device is arranged on the steering wheel rim adjacent to the display device along the vertical axis of the vehicle above the steering axis.

2. The steering wheel assembly as claimed in claim 1, wherein the detection device is embodied as a camera.

3. The steering wheel assembly as claimed in claim 1, wherein the display device has at least a first and a second display element.

4. The steering wheel assembly as claimed in claim 3, wherein the detection device is arranged along the steering wheel rim between the first and second display elements.

5. The steering wheel assembly as claimed in claim 4, wherein the distance between the detection device and in each case one of the two display elements along the steering wheel rim is smaller than the width of at least one of the two display elements.

6. The steering wheel assembly as claimed in claim 1, wherein further detection devices are provided for detecting the state of attentiveness of the driver of the motor vehicle.

7. The steering wheel assembly as claimed in claim 6, wherein the further detection devices are embodied as cameras.

8. The steering wheel assembly as claimed in claim 1, wherein the detection devices are arranged along the steering wheel rim in such a way that at least one of the detection devices is arranged on the vertical axis of the vehicle above the steering axis irrespective of the position of the steering wheel rim.

9. The steering wheel assembly as claimed in claim 1, wherein a hub element which can rotate about the steering axis and which is connected to the steering wheel rim by means of at least one spoke.

10. The steering wheel assembly as claimed in claim 9, wherein a region of the steering wheel rim which comprises the at least one display device.

11. The steering wheel assembly as claimed in claim 10, wherein an airbag module which is arranged on the hub element, having an airbag which, in order to protect the driver, can unfold in a main unfolding direction running on the steering axis, and as it unfolds transversely with respect to the steering axis it can impact against the region of the steering wheel rim.

12. The steering wheel assembly as claimed in claim 11, wherein the region of the steering wheel rim interacts with the airbag in such a way that the latter is deflected in the main unfolding direction when it impacts against the region.

13. The steering wheel assembly as claimed in claim 12, wherein the region for deflecting the unfolding airbag has a deflection slope.

14. The steering wheel assembly as claimed in claim 12, wherein the region for deflecting the unfolding airbag has a surface with a low coefficient of friction.

15. The steering wheel assembly as claimed in claim 1, wherein a sensor device which can be arranged in or on the motor vehicle and has the purpose of detecting distances between the motor vehicle and objects in the surroundings of the motor vehicle.

16. The steering wheel assembly as claimed in claim 15, wherein the display device is designed and provided for displaying the distances detected by the sensor device.

17. The steering wheel assembly as claimed in claim 16, wherein a transmission unit for transmitting output signals of the sensor device to the display device.

18. The steering wheel assembly as claimed in claim 15, wherein the sensor device is provided and designed for converting the measured distances into the size of a parking area.

19. The steering wheel assembly as claimed in claim 15, wherein the sensor device is provided and designed for detecting whether a parking area in the surroundings of the motor vehicle is large enough to park the motor vehicle on this parking area.

20. The steering wheel assembly as claimed in claim 15, wherein the sensor device is provided and designed for displaying information about a parking area by means of the display device.

21. The steering wheel assembly as claimed in claim 1, wherein the display device is provided and designed for displaying a speed limit.

22. The steering wheel assembly as claimed in claim 21, wherein an activation device which is arranged in the vicinity of the steering wheel and is designed and provided for activating a cruise controller which limits the speed of a motor vehicle to the speed limit displayed by means of the display device.

23. The steering wheel assembly as claimed in claim 22, wherein the cruise controller regulates the speed of the motor vehicle to the speed limit which is displayed by means of the display device.

24. The steering wheel assembly as claimed in claim 22, wherein the activation device is arranged on the steering wheel.

25. The steering wheel assembly as claimed in claim 1, wherein an interface which is arranged on the steering wheel and via which at least an instantaneous rotational speed of an engine and/or a gear speed of a transmission of a motor vehicle can be transmitted to the display device in order to display the rotational speed and/or the gear speed.

26. The steering wheel assembly as claimed in claim 25, wherein the display device is connected to an electronic evaluation system which is designed and provided for proposing to the driver a gear speed to be used at least as a function of the instantaneous rotational speed and the instantaneous gear speed.

27. The steering wheel assembly as claimed in claim 26, wherein the display device is provided and designed for displaying the proposal.

28. The steering wheel assembly as claimed in claim 1, wherein the display device is embodied as a visual display.

29. The steering wheel assembly as claimed in claim 28, wherein the visual display has at least one LED.

30. The steering wheel assembly as claimed in claim 28, wherein the visual display has a plurality of LEDs.

31. The steering wheel assembly as claimed in claim 30, wherein the visual display has an LED array.

32. The steering wheel assembly as claimed in claim 28, wherein the visual display has a screen.

33. The steering wheel assembly as claimed in claim 1, wherein the display device is embodied as an acoustic indicator.

34. The steering wheel assembly as claimed in claim 1, wherein the display device is embodied as a haptic indicator.

\* \* \* \* \*